(12) United States Patent
Sedlacek et al.

(10) Patent No.: US 8,374,173 B2
(45) Date of Patent: Feb. 12, 2013

(54) PACKET SWITCHED TO CIRCUIT SWITCHED ACCESS HANDOVERS IN AN IMS ARCHITECTURE

(75) Inventors: Ivo Sedlacek, Lund (SE); Fredrik Lindholm, Alvsjo (SE); Jan Holm, Gavle (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 290 days.

(21) Appl. No.: 12/996,694

(22) PCT Filed: Nov. 12, 2010

(86) PCT No.: PCT/EP2010/067397
§ 371 (c)(1),
(2), (4) Date: Dec. 7, 2010

(87) PCT Pub. No.: WO2012/062379
PCT Pub. Date: May 18, 2012

(65) Prior Publication Data
US 2012/0120914 A1    May 17, 2012

(51) Int. Cl.
*H04L 12/66*  (2006.01)
*H04W 24/00*  (2009.01)
(52) U.S. Cl. ......... 370/352; 370/401; 455/436; 455/439
(58) Field of Classification Search .......... 370/352–356, 370/401; 455/436, 439, 435.1
See application file for complete search history.

(56) References Cited

U.S. PATENT DOCUMENTS
2004/0240430 A1* 12/2004 Lin et al. ................ 370/352
2006/0146803 A1* 7/2006 Bae et al. ................ 370/352
2007/0280162 A1* 12/2007 Deshpande et al. ......... 370/331
(Continued)

FOREIGN PATENT DOCUMENTS
WO    WO 2010/055012 A2    5/2010

OTHER PUBLICATIONS
PCT International Search Report, mailed Jul. 25, 2011 for PCT International Application No. PCT/EP2010/067397, filed on Nov. 12, 2010.

(Continued)

*Primary Examiner* — Andrew Lee
(74) *Attorney, Agent, or Firm* — Myers Bigel Sibley & Sojovec, P.A.

(57) ABSTRACT

A method of enabling the management of handovers of voice calls from a Packet Switched, PS, access to a Circuit Switched, CS, access where the voice calls are established using an IP Multimedia Subsystem, IMS, network. The method comprises performing a first IMS registration of a user via said PS access including setting for the user in a Home Subscriber Server, HSS, of the user's home network, an identifier of a first access transfer control function, which access transfer control function is responsible for anchoring user media sessions in an access transfer gateway of a serving network, and notifying a mobility function within said service network of the set identifier. A second or further IMS registration of the same user is then performed via said PS access, it being determined that said first IMS registration exists. As a consequence, the setting of an identifier of a second or further access transfer control function in the HSS for the user is prevented, while either the setting of the identifier of the first access transfer control function is maintained, or is replaced with an identifier of a service centralization and continuity application server. The mobility function is notified of any change to the set identifier. In the event of a requirement to handover an ongoing voice call associated with said second or further IMS registration from said PS to said CS access, the identifier currently set in the HSS and identified to the mobility function is used to manage the handover.

21 Claims, 15 Drawing Sheets

U.S. PATENT DOCUMENTS

| | | | |
|---|---|---|---|
| 2008/0080382 A1* | 4/2008 | Dahshan et al. | 370/235 |
| 2008/0205381 A1* | 8/2008 | Zhu et al. | 370/352 |
| 2009/0270097 A1* | 10/2009 | Gallagher et al. | 455/435.1 |
| 2009/0323636 A1* | 12/2009 | Dillon et al. | 370/331 |
| 2010/0040020 A1* | 2/2010 | Chen | 370/331 |
| 2010/0215018 A1* | 8/2010 | Ejzak | 370/331 |
| 2011/0075557 A1* | 3/2011 | Chowdhury et al. | 370/230 |
| 2012/0120914 A1* | 5/2012 | Sedlacek et al. | 370/331 |
| 2012/0252451 A1* | 10/2012 | Knauft et al. | 455/436 |

OTHER PUBLICATIONS

PCT Written Opinion of the International Searching Authority, mailed Jul. 25, 2011 for PCT International Application No. PCT/EP2010/067397, filed on Nov. 12, 2010.

"3$^{rd}$ Generation Partnership Project; Technical Specification Group Services and System Aspects; IP Multimedia Subsystem (IMS) Service Continuity; Stage 2 (Release 10)", 3GPP Standard; 3GPP TS 23.237, 3$^{rd}$ Generation Partnership Project (3GPP), Mobile Competence Centre; 650, Route Des Lucioles; F-06921 Sophia-Antipolis Cedex; France; No. V10.3.0, Sep. 29, 2010, pp. 1-149, XP050442324.

Ericsson et al: SRVCC enhancements for 3GPP Draft; S2-104384_WAS_S2-103912_SIP_BASED_ALT_CR_2 (3GPP), Mobile Competence Centre; 650, Route Des Lucioles; F-06921 Sophia-Antipolis Cedex; France; vol SA WG2, No. Brunstad; 20100903, Sep. 6, 2010, XP050459302.

* cited by examiner

PACKET SWITCHED TO CIRCUIT SWITCHED ACCESS HANDOVERS IN AN IMS ARCHITECTURE

CROSS REFERENCE TO RELATED APPLICATION

This application is a 35 U.S.C. §371 national stage application of PCT International Application No. PCT/EP2010/067397, filed on 12 Nov. 2010, the disclosure and content of which is incorporated by reference herein in its entirety.

TECHNICAL FIELD

The present invention relates to the handover of calls, in an IP Multimedia Subsystem (IMS) architecture, from a packet switched to a circuit switched access. The invention is applicable in particular to the handover of voice calls.

BACKGROUND

IP Multimedia (IPMM) services provide a dynamic combination of voice, video, messaging, data, etc, within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP), Existing cellular network deployments are dominated by the 2G and 3G standards. The process of rolling out so-called 4G networks has just begun, and it will be many years before 4G network coverage is sufficient to allow 2G and 3G networks to be withdrawn completely. A fundamental requirement for real-time service provision is the seamless handover of services for subscribers roaming across cell boundaries of the radio access network (RAN). Given the ongoing co-existence of 2G, 3G and 4G networks, it is particularly desirable to allow for the handover of real-time service connections such as voice calls between the different radio access technologies.

Considering further the 4G technology, this is being specified under the name LTE (Long Term Evolution) and SAE (System Architecture Evolution) in 3GPP. The LTE radio access network technology implements only a packet switched access, in contrast to 2G and 3G (using GERAN and UTRAN radio access network technologies respectively) which provide for both packet switched and circuit switched access. In 2G and 3G networks, packet switched connections are used to carry data whilst circuit switched connections are used for real-time services such as voice calls. In 4G networks, all services will be carried via packet switched connections. In the case of a voice call initiated when a user is attached to a LTE radio access network (termed Enhanced UTRAN or E-UTRAN), that call will of course make use of a packet switched connection. If it is necessary for the call to be transferred to a 2G or 3G radio access network, e.g. because the user roams out of the coverage area of the E-UTRAN and into that of a GERAN or UTRAN network, the call must be switched from a packet switched (PS) access to a circuit switched (CS) access. Of course, the process for implementing the handover must be seamless such that little or no disruption of the call is perceived by the user. An appropriate access handover mechanism is also required in the case of the handover of a call from a PS access using a 3G UTRAN (HSPA) access network to a CS call using either 3G UTRAN access or 2G GSM access.

FIG. 1 illustrates schematically a scenario in which a user terminal (or User Equipment, UE, according to 3G terminology) initiates a voice call using a LTE radio access network and is subsequently handed over to a GSM/Edge Radio Access Network (GERAN). The call is established using the IMS network described above and which provides a common service control network for the PS and CS domains provided through the LTE, UTRAN, or GERAN radio accesses. In particular, the IMS includes a Multimedia Telephony (MMTel) Application Server which implements service logic for establishing and controlling voice calls. In order to implement the access handover, media control must be transferred from the Evolved Packet Core (EPC) network of the 4G domain to an allocated Mobile Switching Centre (MSC) within the 2G domain. Other components illustrated in FIG. 1 are a Mobile Switching Centre Server (MSS) which has support for the GSM access network, an enhanced Node B (eNodeB) which provides inter alia control of radio access within the LTE RAN, a Serving/PDN gateway (S/P-GW), a Mobility Management Entity (MME) (both the S/P-GW and the MME reside within the EPC), and a Home Subscriber Server that resides within a subscriber's home network.

The S/P-GW sits in the user plane where it forwards and routes packets to and from the eNodeB and the PDN GW. The S/P-GW also serves as the local mobility anchor for inter-eNodeB handovers and roaming between two 3GPP systems. The PDN GW (not shown in FIG. 1) acts as the interface between the radio network and the Packet Data Networks (PDNs), such as the Internet or SIP-based IP Multimedia Subsystem (IMS) networks (fixed and mobile). The PDN GW is the mobility anchor point for intra-3GPP access system mobility and for mobility between 3GPP access systems and non-3GPP access systems.

Interworking solutions for IMS Centralized Services (ICS) as specified in 3GPP TS 23.292, "IP Multimedia Subsystem (IMS) centralized services; Stage 2", allows IMS sessions using CS bearers to be treated as standard IMS sessions, which is required for the purpose of IMS Service Continuity. ICS defines signalling mechanisms between the UE and IMS for transport of information to centralise the service in the IMS, and TS 23.237 "IP Multimedia Subsystem (IMS) Service Continuity" defines the additional procedures needed for service continuity when using CS access for media transport. Within the context of TS 23.292 and TS 23.237, the further 3GPP document TS 23.216: "Single Radio Voice Call Continuity (SRVCC); Stage 2", describes a mechanism for handing over a voice call from a PS to a CS access. With reference to FIG. 1, this relies upon ICS and Service Continuity functionality that is implemented in the Service Centralisation and Continuity Application Server (SCC AS) within the IMS (shown co-located with the MMTel AS in FIG. 1). Whilst effective, the mechanism described in TS 23.216 (identified as Rel-9) involves a relatively long path for handover control signalling given that the SCC AS is located in a user's home network and the signalling may have to pass through an IMS network associated with a visited network (in the case of a roaming subscriber where the serving network is not the home network). Handovers may be delayed as a result, possibly giving rise to interruptions in voice calls. SRVCC is applicable to handover to a CS access from a PS access where that PS access is provided by either of a LTE access or a UTRAN (HSPA) access.

It has been recognised that such a long path for access handover related signalling is undesirable. This problem is addressed in TS 23.237, "IP Multimedia Subsystem (IMS) Service Continuity", which proposes introducing the architecture illustrated in FIG. 2. An Access Transfer Control Function (ATCF) is included in the serving (e.g. visited) IMS network. This approach is referred to as Rel-10. According to Rel-10, the ATCF acts as a media gateway controller for an Access Transfer Gateway (ATGW) that is also present in the serving IMS network. The ATGW acts as an anchor for the IMS media traffic to allow media traffic to be switched quickly from the PS access network to the CS access network via the MSC. Additional functions of IMS Service Continuity are provided by the ATCF/ATGW in the serving (visited if roaming) network. In particular, responsibility for managing radio access handovers is delegated from the SCC AS to the ATGW. Within the CS core network, a SRVCC function is introduced into one of the network MSCs. This may or may not be the same MSC as the Target MSC for the handover.

When the UE performs IMS registration, a decision is made (by the P-CSCF) as to whether or not to include the ATCF in the path. If the ATCF is included, the ATCF reports a Session Transfer Number Single Radio (STN-SR) to the SCC AS in the home IMS network. This STN-SR is recorded by the SCC-AS in the HSS in respect of the ongoing IMS session. The STN-SR points uniquely to the ATCF. When the UE is either initiating or receiving an incoming call, the ATCF makes a decision concerning whether or not to anchor the media in the controlled ATGW. If the media is anchored at the ATGW, then when an access handover takes place, the redirection of media to the new access will be carried out locally in the serving (e.g. visited) network. The anchored media in the ATGW is redirected to the CS side instead of the PS side. This procedure is illustrated further in FIG. 3 which shows the signalling and media paths before and after handover.

FIG. 4 shows the Rel-10 IMS registration procedure in more detail. The figure illustrates in particular that the ATCF in the serving network includes its STN-SR in the IMS Register message that it forwards to the home network of UE-1 at registration of that subscriber. This STN-SR is recorded by the SCC-AS in the HSS in respect of the ongoing IMS session, and the HSS further updates the MME(LTE)/SGSN (UTRAN HSPA) with the changed user information (STN-SR) by sending an Insert Subscribe Data to the MME/SGSN, including the STN-SR. By so doing, the MME/SGSN will have the latest STN-SR pointing to the ATCF to be used at handover. It is noted that, if the ATCF decides not to be included (or no ATCF is present), no STN-SR will be sent to the SCC AS. The SCC AS will then update the HSS with the STN-SR pointing to the SCC AS, and the SRVCC procedures will fall back to the Rel-9 SRVCC procedures.

Referring now to FIG. 5, this figure illustrates an originating (side) procedure that occurs following IMS registration of UE-1 according to the procedure of FIG. 4. Relevant to this discussion are the media anchor decision made by the originating side ATCF upon receipt of the SIP Invite originating from UE-1 (and a possible Late Media Anchor decision made by the same node), and the sending of Transfer information from the SCC AS in the home network to the ATCF for storage by the ATCF for the duration of the call. The Transfer information sent to and stored by the ATCF includes the C-MSISDN and the ATU-STI. The C-MSISDN provides information that helps the ATCF to correlate the IMS session over the PS access with the INVITE sent from the MSC Server during a session transfer, whilst the ATU-STI provides routing information to the SCC AS (in effect, the ATU-STI is an address of the SCC AS). FIG. 6 illustrates a corresponding terminating (side) procedure that again assumes that the relevant subscriber, that is UE-1, has performed IMS registration according to the procedure of FIG. 4, prior to UE-2 sending a SIP Invite addressed to UE-1.

Referring now to FIG. 7, this figure illustrates the access transfer procedures when the UE has its media moved from the PS access to the CS access. The UE and the network detect that SRVCC needs to be applied (e.g., the UE is losing LTE radio coverage). This then triggers the MME/SGSN to inform the MSC Server to initiate the access transfer procedures, notifying the MSC Server of the STN-SR previously provided to the MME/SGSN. The MSC Server sends an INVITE to the ATCF using the received STN-SR. The INVITE includes also the C-MSISDN. The INVITE is routed to the ATCF, which can then correlate the INVITE with the ongoing session that the user has on the PS access, using the C-MSISDN. The ATCF can then update the ATGW to move the media path from the PS to the CS access (i.e., send the media towards the MSC/MGW instead). The ATCF also informs the SCC AS about the access transfer, and additional mid call states may be transferred.

SRVCC enhancements as described in TS 23.237 (v10.3.0) require that a UE has only one IMS registration at a given time (S2-104384, 6.1.2). The reason for this is that the ATCF is selected when the UE registers with the IMS, with the STN-SR for the ATCF being provided to the MME/SGSN via the SCC AS. When SRVCC (PS to CS access handover) takes place, the SRVCC INVITE request (sent by the MSC Server in the CS access network) is routed to a single ATCF using the single known STN-SR, with the ATCF then transferring the most recently active speech session established in the E-UTRAN/UTRAN network. To select the session, the ATCF must be aware of all the speech sessions of the UE established in E-UTRAN/UTRAN network. However, 3GPP TS 24.229 allows a UE to make several IMS registrations even in LTE/GPRS network, for example to provide for failure handling. This capability should not be restricted by SRVCC. Currently, if multiple registrations were to be done (through different ATCFs), it is not clear what would happen as only one STN-SR can be provided to the HSS (and MME/SGSN). A problem to be addressed therefore is how to allow a UE to perform multiple IMS registrations while at the same time allowing for SRVCC access handovers.

SUMMARY

It is an object of the present invention to provide an efficient mechanism for performing handover of a voice call from a PS to a CS access, whilst still allowing a user to maintain multiple, parallel, IMS registrations.

According to a first aspect of the present invention there is provided a method of enabling the management of handovers of voice calls from a Packet Switched, PS, access to a Circuit Switched, CS, access where the voice calls are established using an IP Multimedia Subsystem, IMS, network. The method comprises performing a first IMS registration of a user via said PS access including setting for the user in a Home Subscriber Server, HSS, of the user's home network, an identifier of a first access transfer control function, which access transfer control function is responsible for anchoring user media sessions in an access transfer gateway of a serving network, and notifying a mobility function within said service network of the set identifier.

A second or further IMS registration of the same user is then performed via said PS access, it being determined that said first IMS registration exists. As a consequence, the setting of an identifier of a second or further access transfer control function in the HSS for the user is prevented, whilst either the setting of the identifier of the first access transfer control function is maintained, or is replaced with an identifier of a service centralisation and continuity application server. The mobility function is notified of any change to the set identifier.

In the event of a requirement to handover an ongoing voice call associated with said second or further IMS registration from said PS to said CS access, the identifier currently set in the HSS and identified to the mobility function is used to manage the handover.

Embodiments of the present invention prevent any conflict arising from multiple IMS registrations. A handover session request will always be provided to the ATCF that is responsible for anchoring a media session.

According to a second aspect of the present invention there is provided an IP Multimedia Subsystem application server configured to implement service centralisation and continuity functionality to enable the management of handovers of voice calls from a Packet Switched, PS, access to a Circuit Switched, CS, access where the voice calls are established using an IP Multimedia Subsystem, IMS, network within which the application server resides.

The application server comprises:
a first Home Subscriber Server, HSS, setting unit configured, at a first IMS registration of a user via said PS access, to set for the user in a Home Subscriber Server, HSS, of the user's home network, an identifier of a first access transfer control function, which access transfer control function is responsible for anchoring user media sessions in an access transfer gateway of a serving network;
a first notifying unit for notifying a mobility function within said service network of the set identifier;
a second Home Subscriber Server, HSS, setting unit configured, at a second or further IMS registration of the same user via said PS access, to determine that said first IMS registration exists and, as a consequence, to prevent the setting of an identifier of a second or further access transfer control function in the HSS for the user, whilst either maintaining the setting of the identifier of the first access transfer control function or replacing that with an identifier of a service centralisation and continuity application server; and
a second notifying unit for notifying said mobility function of any change to the set identifier.

According to a third aspect of the present invention there is provided apparatus for implementing an access transfer control function to control an access transfer gateway, and to enable the management of handovers of voice calls from a Packet Switched, PS, access to a Circuit Switched, CS, access where the voice calls are established using an IP Multimedia Subsystem, IMS, network.

The apparatus comprises:
an IMS registration unit for forwarding an IMS registration request for a user to a service centralisation and continuity application server and for including in the registration request an identifier of the apparatus if the apparatus wishes to anchor subsequent media sessions on behalf of the user;
a media anchor controller for subsequently receiving from said service centralisation and continuity application server, an instruction not to anchor said media sessions and for acting accordingly; and
a session invitation handler for forwarding session invitations in respect of said user, to a peer access transfer control function identified in said instruction or to said service centralisation and continuity application server.

According to a fourth aspect of the present invention there is provided apparatus for implementing an access transfer control function to control an access transfer gateway, and to enable the management of handovers of voice calls from a Packet Switched, PS, access to a Circuit Switched, CS, access where the voice calls are established using an IP Multimedia Subsystem, IMS, network.

The apparatus comprises:
an IMS registration unit for forwarding an IMS registration request for a user to a service centralisation and continuity application server and for including in the registration request an identifier of the apparatus;
a media anchor controller for subsequently receiving from said service centralisation and continuity application server, an instruction to anchor media sessions handled by a peer access transfer control function; and
a subscription unit for subscribing the apparatus to one of said service centralisation and continuity application server and said peer access transfer control function so as to receive notifications of changes of active/held sessions handled by said peer access transfer control function.

BRIEF DESCRIPTION OF THE DRAWINGS

FIG. 11 illustrates inter-node signalling according to the second variation, but for the case where an ATCF associated with a second registration does not provide its STN-SR to the SCC-AS;

FIG. 18 illustrates schematically apparatus configured to operate as an SCC-AS.

DETAILED DESCRIPTION

As has been discussed above, the 3GPP Single Radio Voice Call Continuity (SRVCC) mechanism provides for the handover of a voice call from a Packet Switched (PS) access to a Circuit Switched (CS) access, whilst the enhancements introduced in Rel-10 provide for an optimised access handover procedure by delegating certain responsibilities from the SCC-AS in a subscriber's home network to an ATCF in a serving (e.g. visited) network. In order to allow this optimised access handover procedure to be fully implemented whilst at the same time allowing subscribers to maintain multiple, parallel IMS registrations, a number of alternative improvements are presented here. Common to all variants is the feature that, upon a second (or further) IMS registration by a user, the setting in the HSS of the STN-SR identifying the ATFC associated with the second (or further) registration is prevented. Either the setting of the STN-SR identifying the ATCF associated with the first registration is maintained, or the currently set STN-SR is replaced with that identifying the SCC-AS.

Variant 1

This variation assumes that a UE has an existing registration to the IMS using an EPC (with E-UTRAN or UTRAN) or GPRS (with UTRAN), and that the UE then adds another registration to the IMS using the EPC or GPRS. The SCC AS determines that a second registration is being performed. To avoid confusion occurring within the service network, the SCC AS in the subscriber's home network sets its own STN-SR in the HSS (i.e. thus disabling the SRVCC enhancements and falling back to the Rel-9 access handover procedure).

Variant 2

Figure 1:
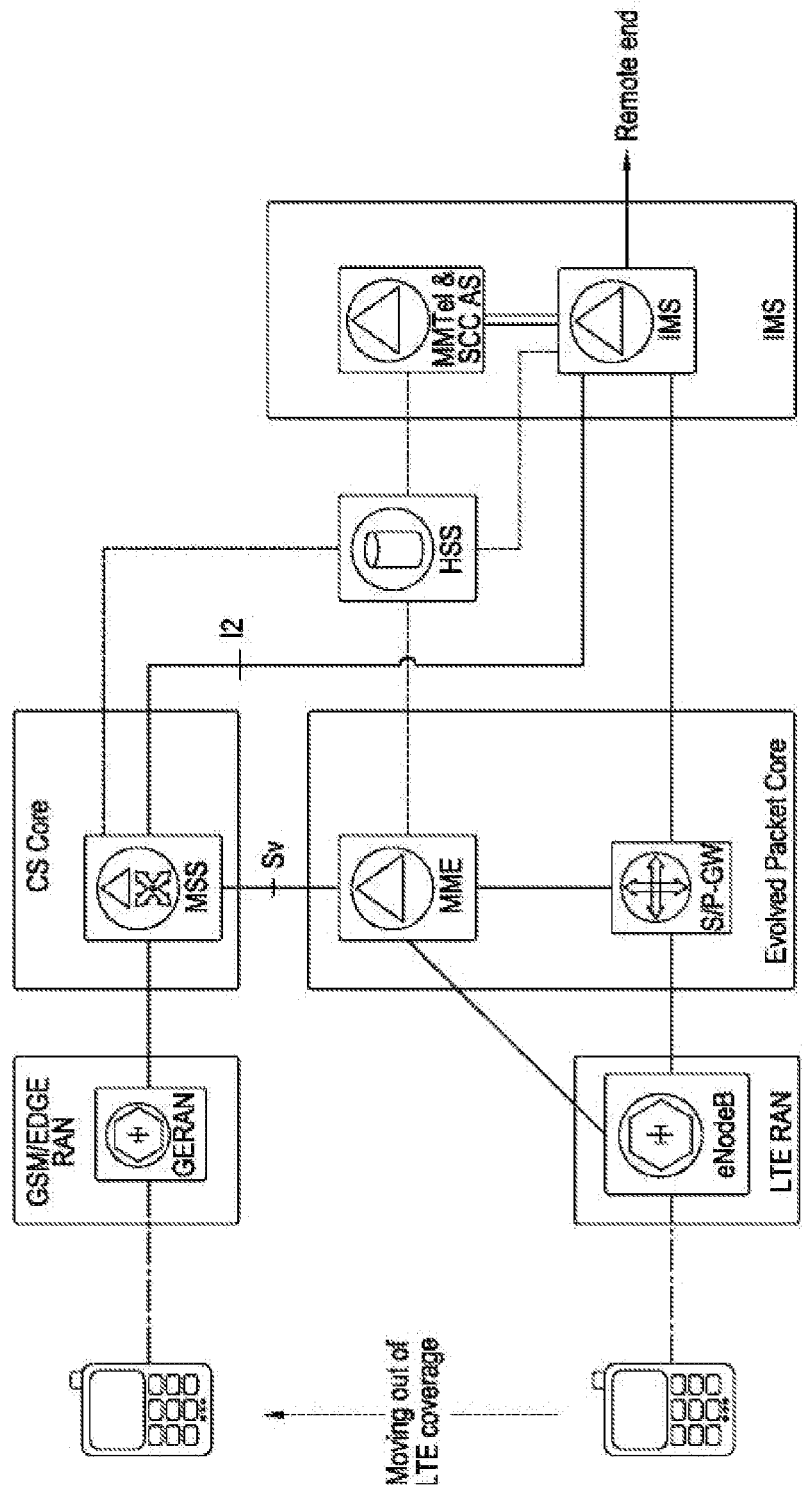
FIG. 1 illustrates schematically a prior art architecture for managing PS to CS handover of voice calls according to 3GPP Rel-9.
Figure 2:
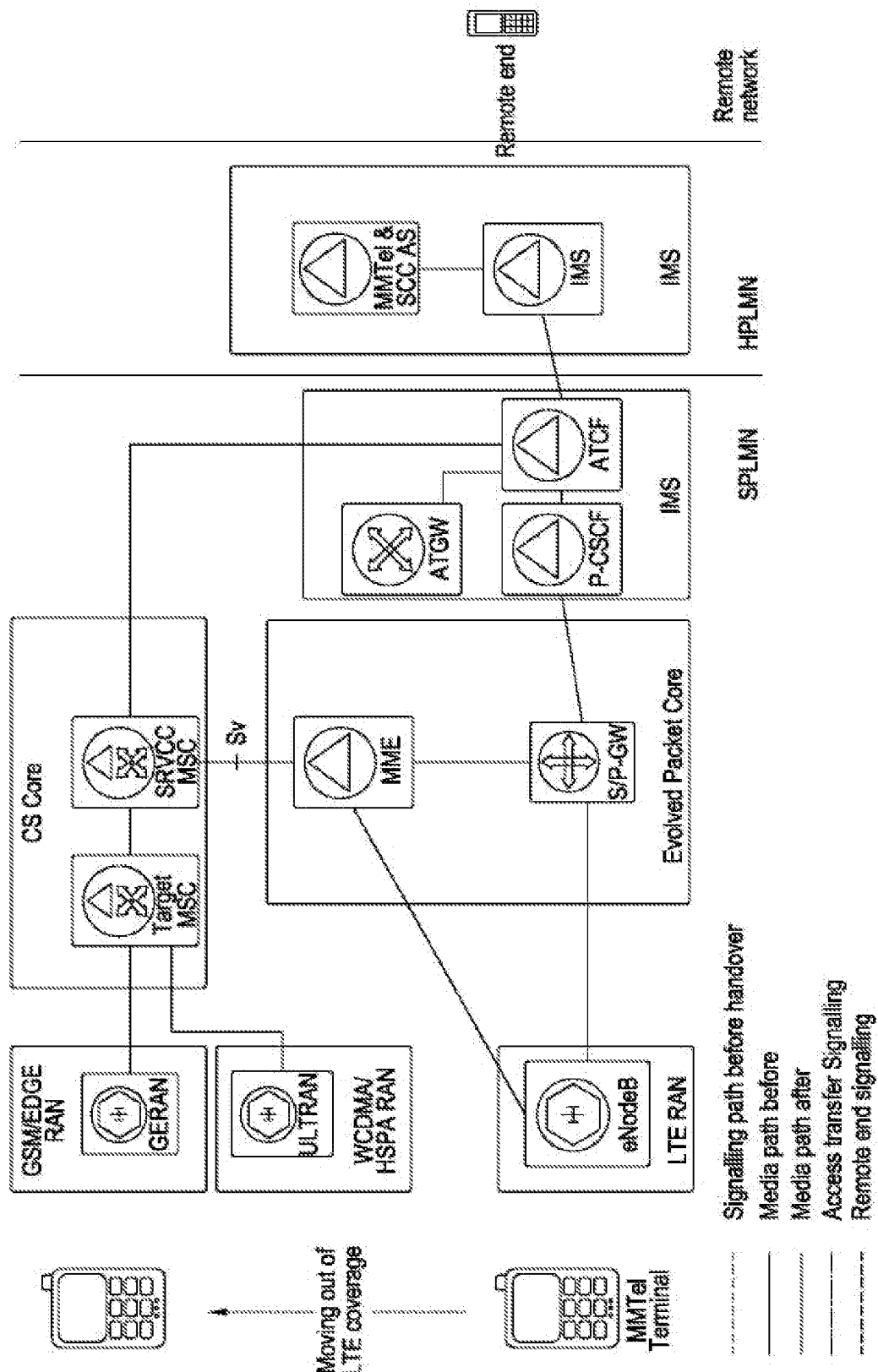
FIG. 2 illustrates schematically a prior art architecture for managing PS to CS handover of voice calls according to 3GPP Rel-10.
Figure 3:
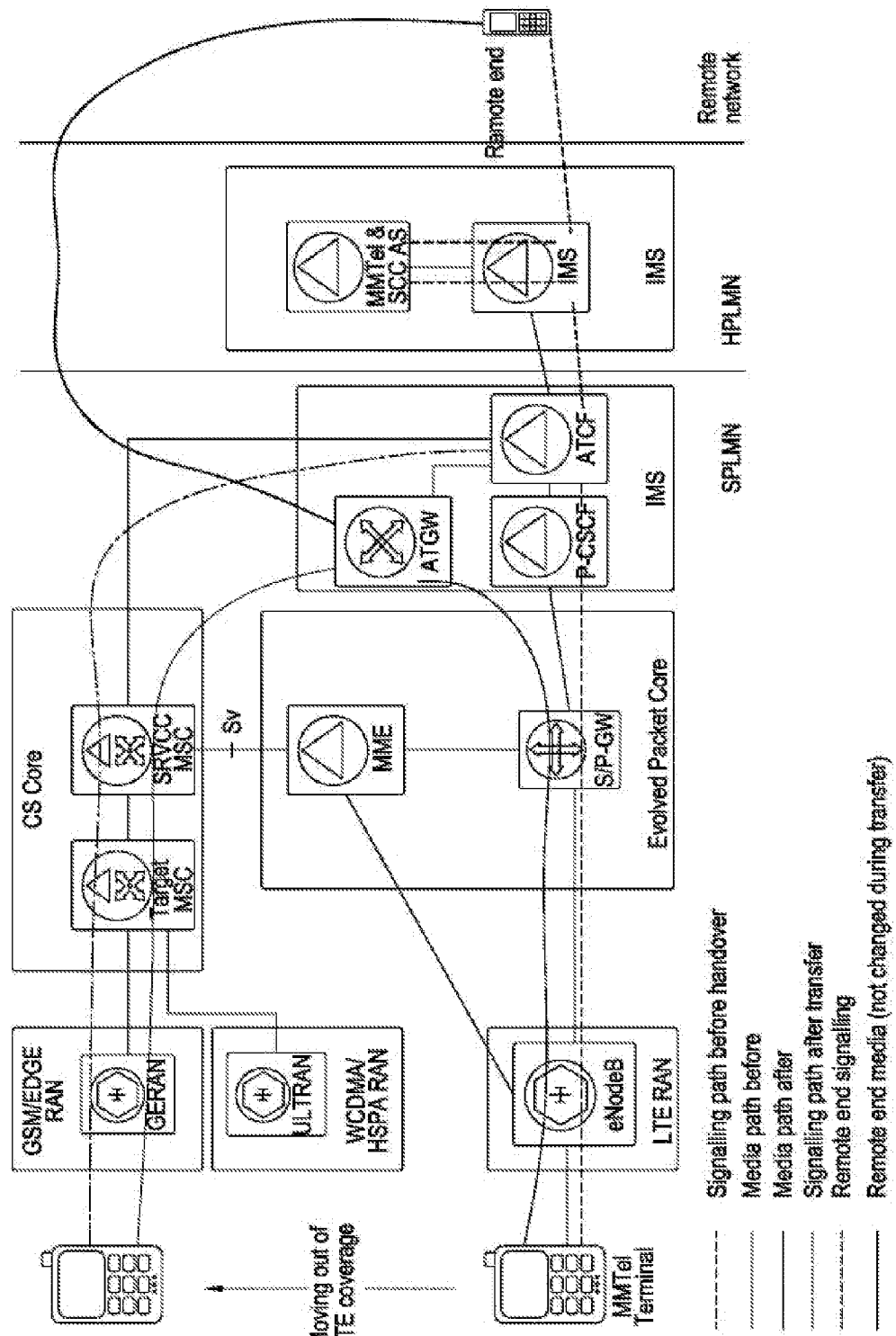
FIG. 3 illustrates media and signalling paths within the architecture to FIG. 2.
Figure 4:
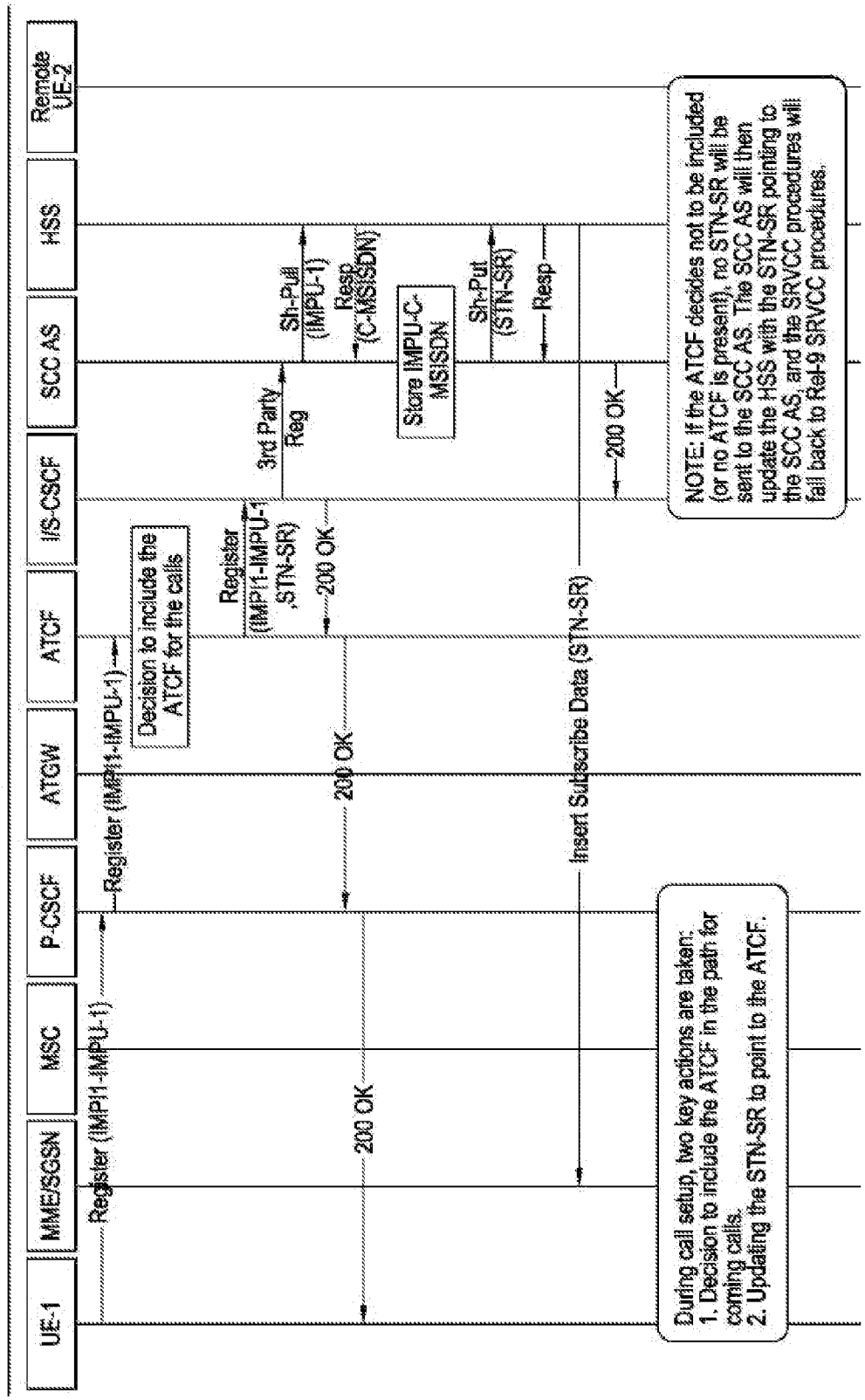
FIG. 4 illustrates inter-node signalling associated with user IMS registration according to the Rel-10 architecture.
Figure 5:
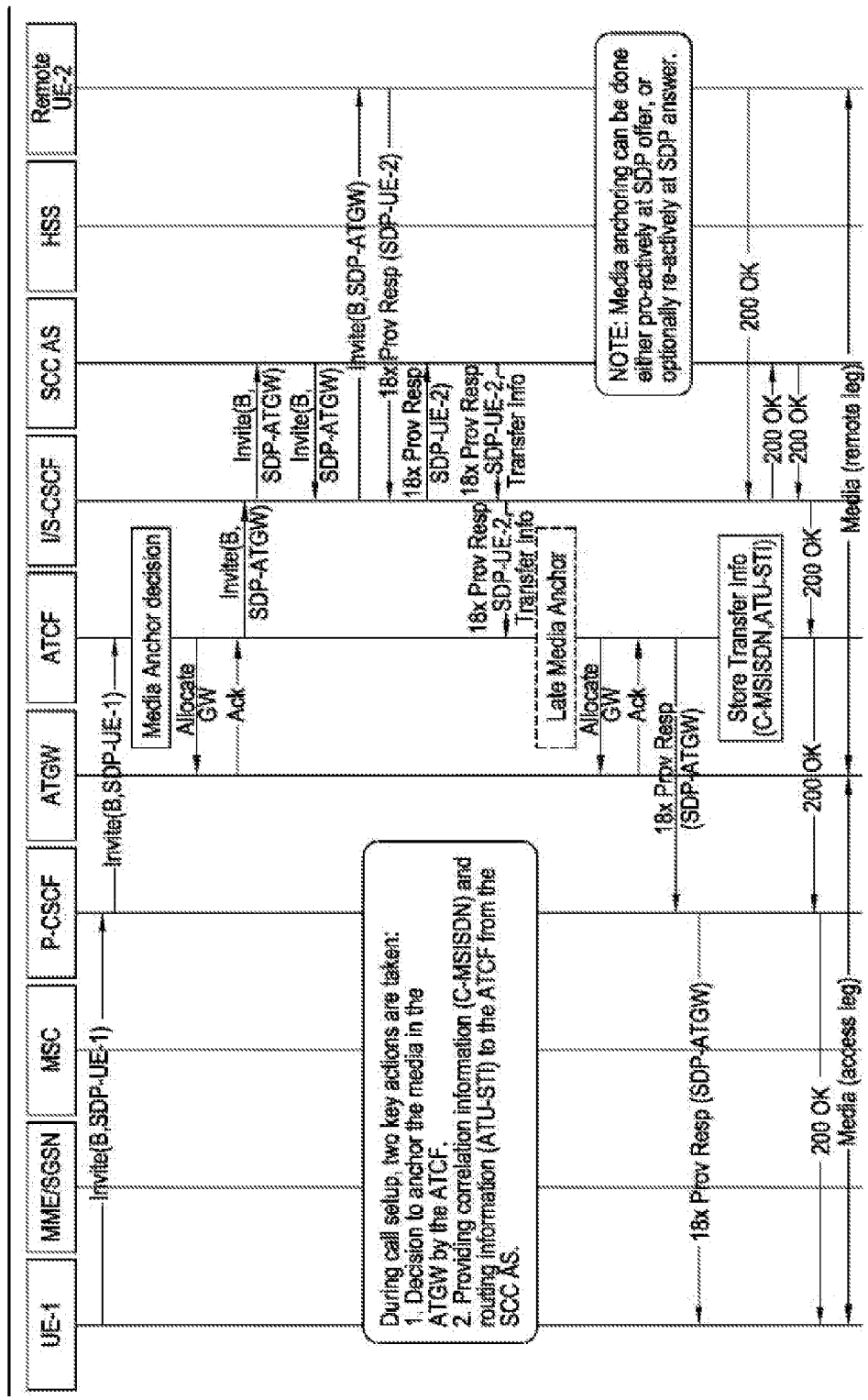
FIG. 5 illustrates inter-node originating side session establishment procedures according to Rel-10.
Figure 6:
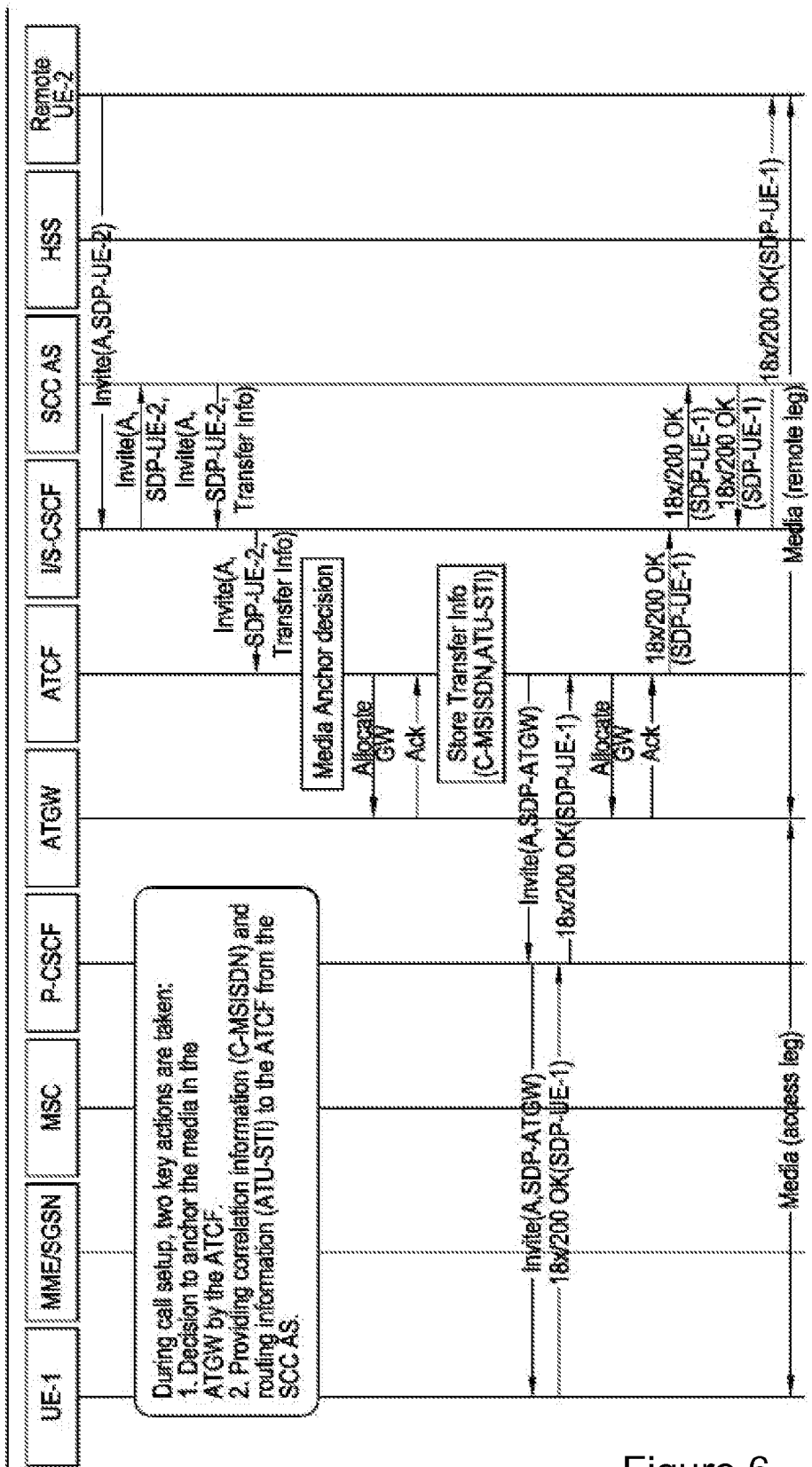
FIG. 6 illustrates inter-node terminating side session establishment procedures according to Rel-10.
Figure 7:
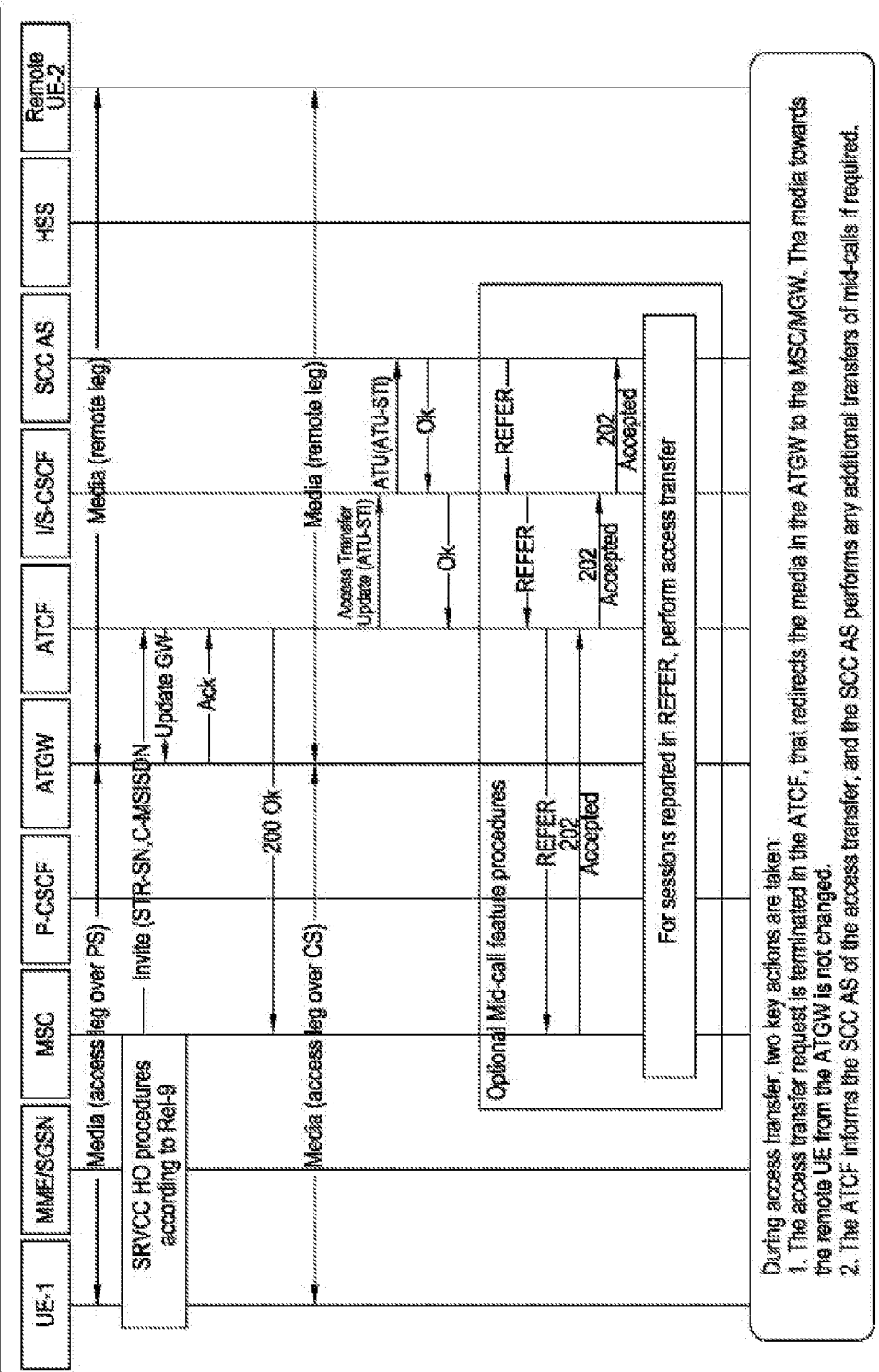
FIG. 7 shows inter-node access transfer procedures associated with a PS to CS handover according to Rel-10.
Figure 8:
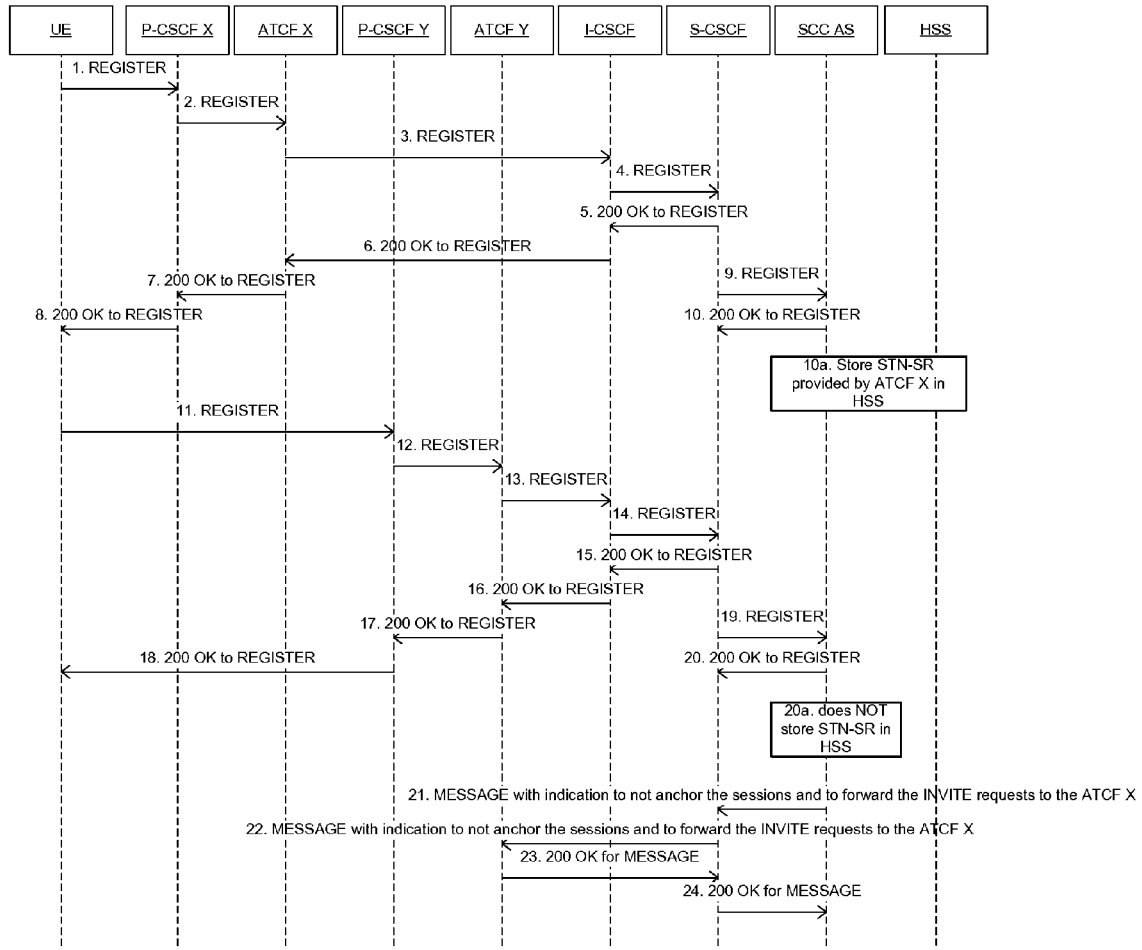
FIG. 8 illustrates inter-node signalling according to a second variation of an improvement to the Rel-10 procedures, where the signalling is associated with a first and a subsequent second IMS registration.
Figure 9:
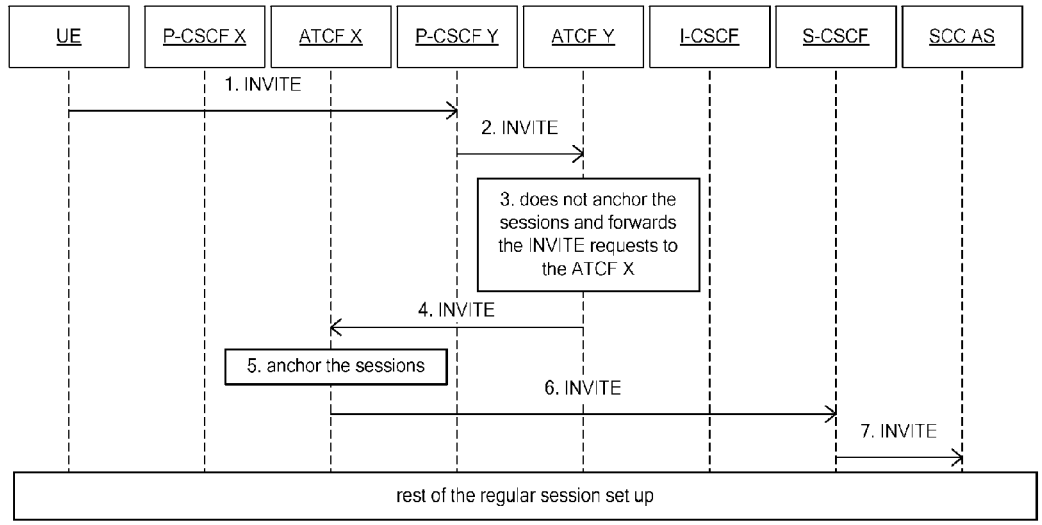
FIG. 9 illustrates inter-node signalling for the second variation, the signalling being associated with originating side session establishment procedures.
Figure 10:
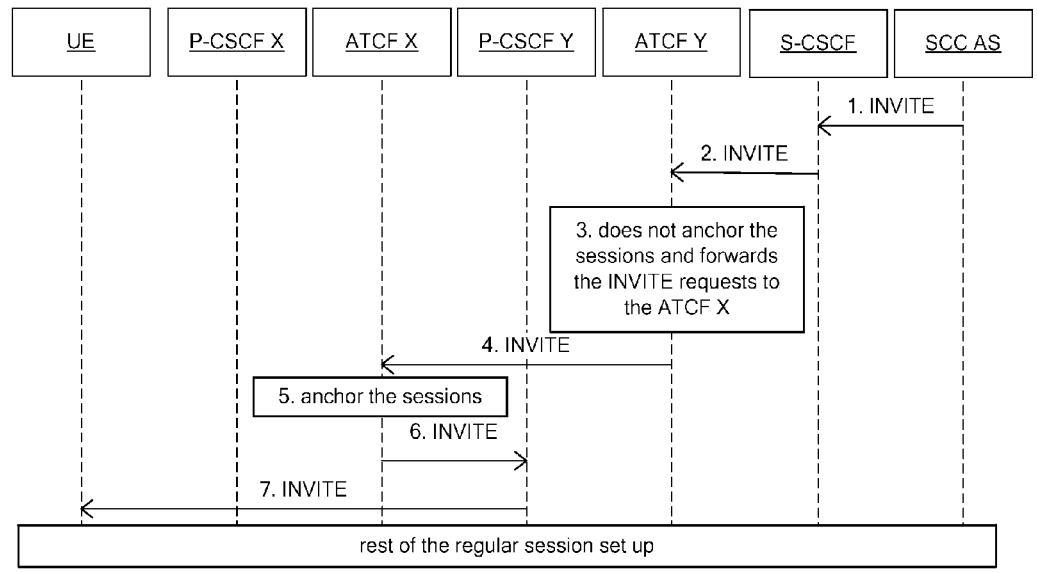
FIG. 10 illustrates inter-node signalling for the second variation, the signalling being associated with terminating side session establishment procedures.
Figure 11:
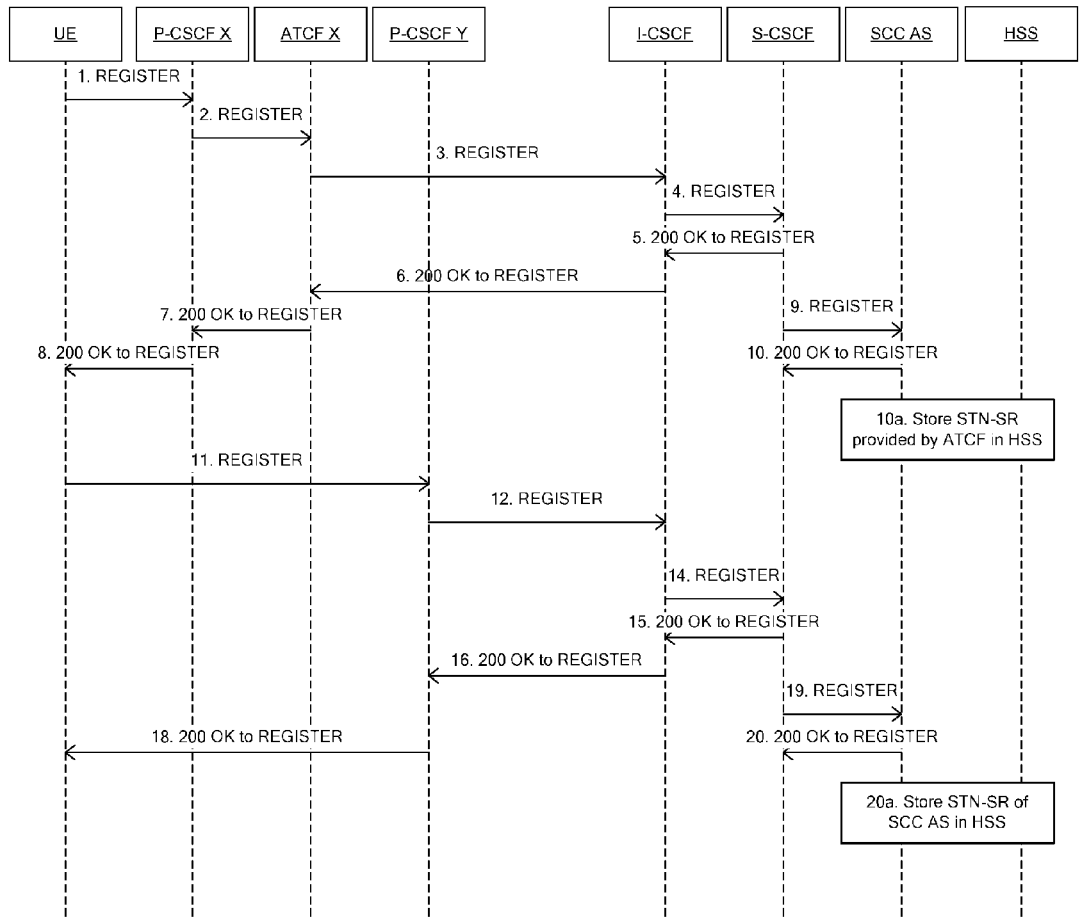
Figure 12:
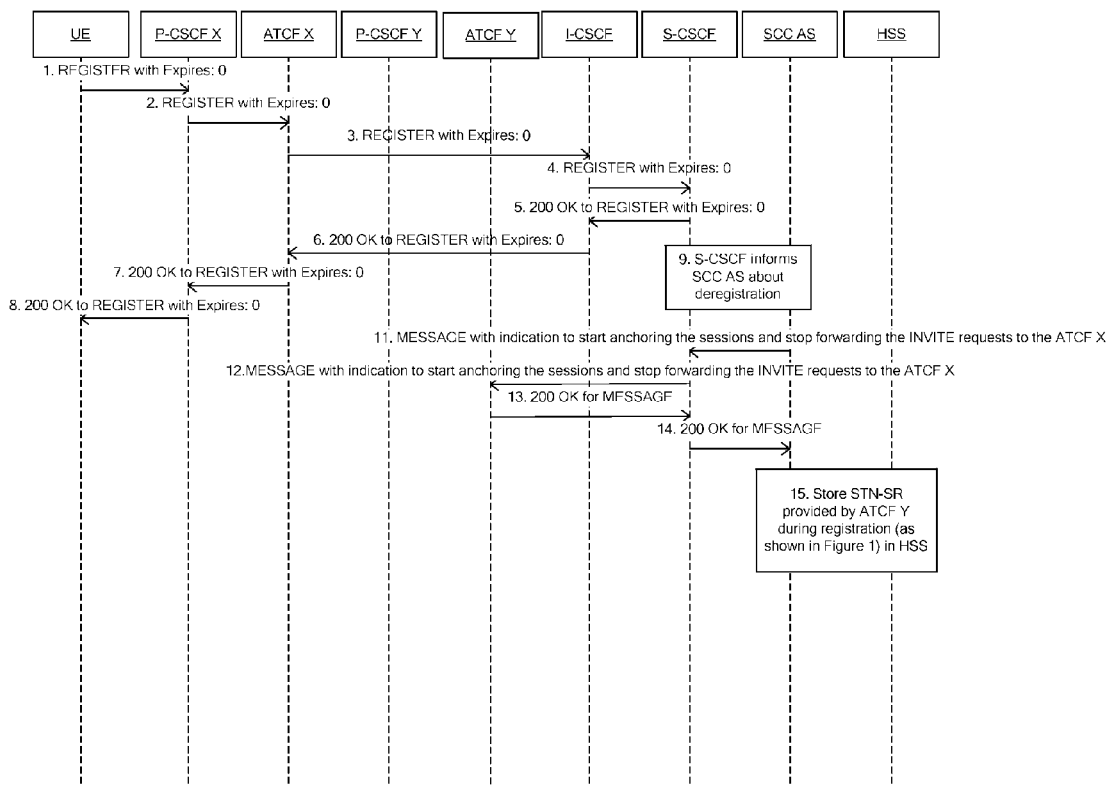
FIG. 12 illustrates inter-node signalling for the second variation associated with a de-registration procedure.

Assuming again that a UE has an existing registration in the IMS using an EPC or GPRS, and then adds another registration in the IMS using the EPC or GPRS, then the procedure illustrated in FIG. 8 is followed. This procedure is described further as follows:

1) If an STN-SR identifying a first ATCF (ATCF X) was included in the existing registration and if an STN-SR identifying a second, different ATCF (ATCF Y) is included in the added registration, then;
   a) the SCC AS does not set the STN-SR provided in the added registration in HSS (i.e. the HSS will continue to contain the STN-SR pointing to ATCF X),
   b) the SCC AS indicates to ATCF Y (message 22 in FIG. 8) that it should not anchor the sessions and should forward the INVITE requests to ATCF X, and
   c) based on the SCC AS indication, ATCF Y does not anchor the sessions and forwards any future INVITE requests initiated by the UE to the ATCF X which anchors the requested session. This is illustrated in FIG. 9 for the originating side case and in FIG. 10 for the terminating side case;

2) If an ATCF STN-SR was included in the existing registration and no ATCF STN-SR is included in the added registration (as in FIG. 11), then the SCC AS sets its own STN-SR in the HSS (i.e. thus disabling the SRVCC enhancements and falling back the Rel-9);

3) If an ATCF STN-SR was not included in the existing registration and if an STN-SR identifying ATCF is included in the added registration, then the SCC AS does not set the STN-SR provided in the added registration in HSS (i.e. the HSS will continue to contain the STN-SR pointing to the SCC AS);

4) If the UE de-registers an existing registration with the IMS such that only one registration remains and the STN-SR of an ATCF was included in this remaining registration, e.g. that in respect of ATCF Y, then (as shown in FIG. 12):
   a) If the SCC AS previously indicated to ATCF Y not to anchor the sessions and to forward INVITE requests to ATCF X, then the SCC AS will indicate to ATCF Y to start anchoring the sessions and to stop forwarding the INVITE requests to ATCF X; and
   b) The SCC AS sets the STN-SR provided previously (i.e. during the added registration) by ATCF Y in the HSS.
   As de-registration can occur in any order, a similar procedure applies if the UE first de-registers the registration made in respect of ATCF Y, leaving only that made in respect of ATCF X.

Variant 3

This further alternative approach to managing PS to CS access handovers follows that of variant 2 described above, with the difference that bullet point 2) is modified as follows:

2) If an ATCF STN-SR is included in one IMS registration but not the other, then
   a) whenever the UE establishes a first session using an IMS registration without the ATCF STN-SR, then the SCC AS sets its own STN-SR in the HSS (i.e. thus disabling the SRVCC enhancements and falling back to Rel-9);
   b) whenever the UE releases the last (remaining) session across all IMS registrations without an ATCF STN-SR, then the SCC AS sets (in the HSS) the STN-SR of the ATCF anchoring any remaining sessions.

This variant allows sessions to benefit from the SRVCC enhancements providing that no other sessions are ongoing for which there is no ATCF anchor.

Variant 4

Figure 13:
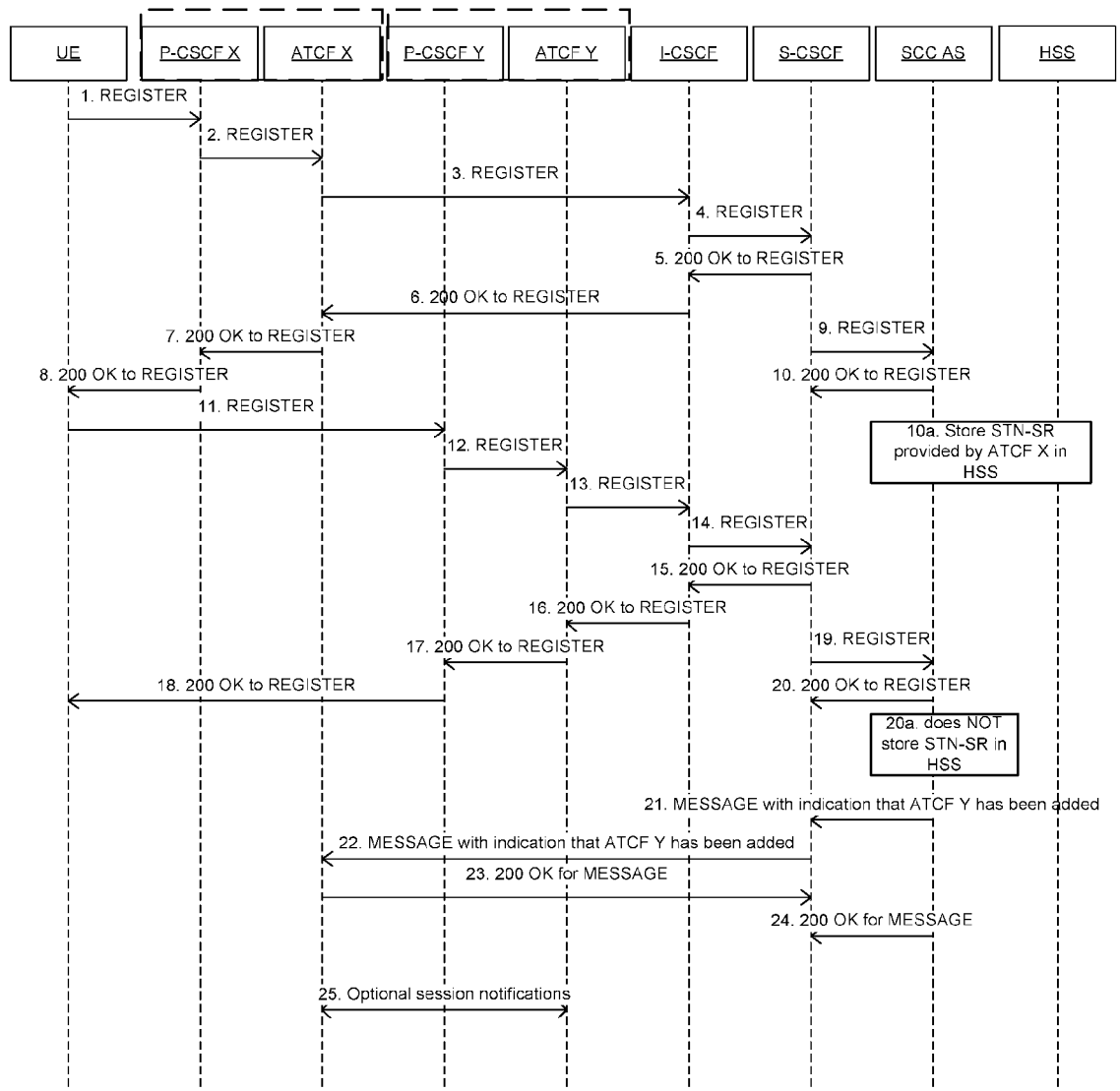
FIG. 13 illustrates inter-node signalling according to a fourth variation of an improvement to the Rel-10 procedures, where the signalling is associated with a first and a subsequent second IMS registration.
Figure 14:
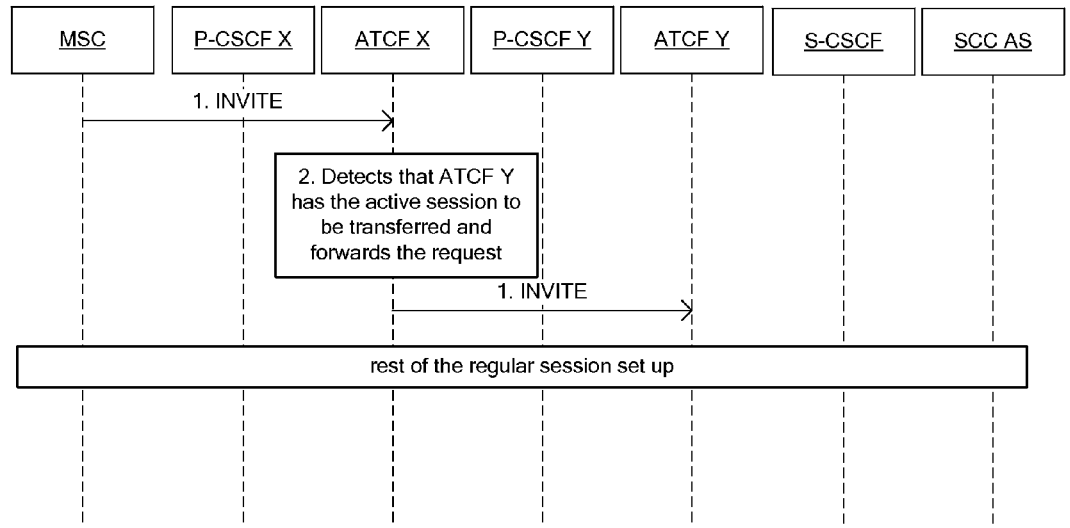
FIG. 14 illustrates inter-node signalling for the fourth variation, where a first ATCF X forwards handover related session invitations to a peer ATCF Y responsible for anchoring the sessions.
Figure 15:
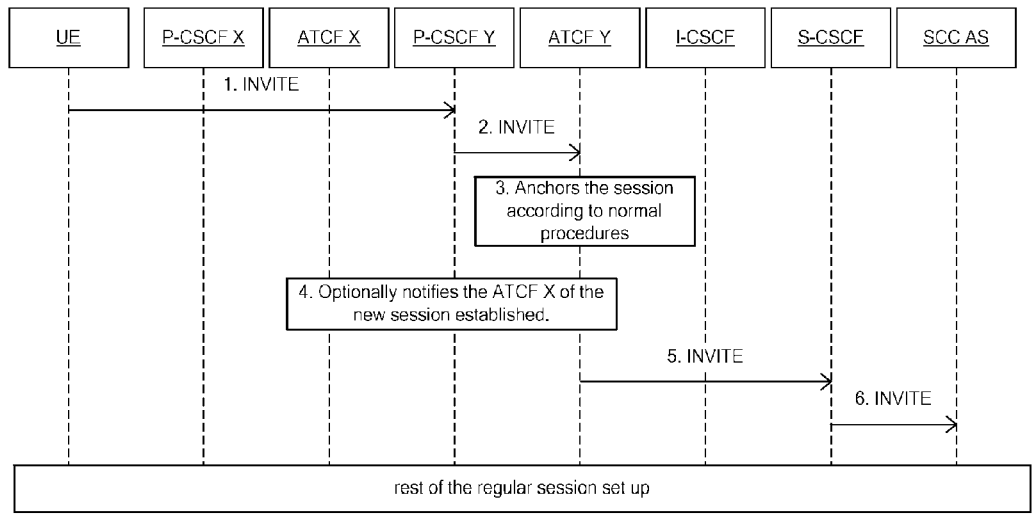
FIG. 15 illustrates inter-node signalling for the fourth variation, where based upon a subscription, an ATCF Y informs a peer ATCF X of active sessions.

This variant is a further elaboration of variants 2 and 3 above. According to variant 4, when a UE has an existing IMS registration made using the EPC or GPRS, and adds another IMS registration, then:

1) If an ATCF STN-SR (e.g. ATCF X) was included in the existing registration and if another ATCF STN-SR (e.g. ATCF Y) is included in the added registration, then
   a) the SCC AS does not set the STN-SR provided in the added registration in the HSS (i.e. The HSS will continue to contain the STN-SR pointing to ATCF X), and ATCF X will continue to be the primary ATCF; and
   b) the SCC AS indicates to ATCF X that ATCF Y exists (as shown in FIG. 13); and
   c) ATCF X will anchor any sessions initiated through P-CSCF X, and ATCF Y will anchor any sessions initiated through P-CSCF Y. During access handover, the INVITE (from the SRVCC MSC) will be sent to ATCF X and, if ATCF X is not handling the session, it will forward the request to ATCF Y (as illustrated in FIG. 14). ATCF X may subscribe to ATCF Y for changes of active/held sessions in order to know which sessions exist (FIG. 15 illustrates one such notification).
2) If an ATCF STN-SR was included in the existing registration and no ATCF STN-SR is included in the added registration, then the SCC AS sets its own STN-SR in the HSS and will act as the primary access transfer function. This implies that when the MSC sends the INVITE using the STN-SR, the INVITE will end up in the SCC AS. The SCC AS will then perform the procedures of detecting if this session is anchored/handled directly by the SCC AS, or if this should be sent to, for example, ATCF X. The procedures are analogue to those of FIG. 14, but where the SCC AS instead of ATCF X is the primary access transfer function and forwards the INVITE.
3) If an ATCF STN-SR was not included in the existing registration and if an STN-SR identifying ATCF is included in the added registration, then the SCC AS does not set the STN-SR provided in the added registration in the HSS (i.e. the HSS will continue to contain the STN-SR pointing to SCC AS);

The benefits of variant 4 are achieved in particular:

When the ATCF is collocated with the P-CSCF. The benefit that variant 4 gives when the ATCF is collocated with the P-CSCF is that, as long as the call is on the PS access only, the call will not need to be routed through another ATCF/P-CSCF as well (which would occupy resources in two P-CSCFs).

When it is not always possible to predict if a UE can reach the same P-CSCF/ATCF via both or all IMS registrations, for example if a UE is using two different Access Point Names (APNs) over the LTE access to provide for redundancy. Each of these APNs may in theory have overlapping private address spaces (i.e., both may use a private network space 192.168.x.x). This would then result in the UE only being able to access the P-CSCF in the local private network, and it would not be able to reach a P-CSCF in any other part of the access network. In other words, the UE would from the first APN only be able to contact the P-CSCF connected to that particular APN and not the P-CSCF connected to the second APN.

It will be understood that, for all of the variants considered above, the "primary" access transfer function can always remove itself from the session path when an INVITE is sent by ensuring that it is not record routed. [The record route includes the nodes that are involved in the communication and the order in which they should be contacted. If a node is not included in the record route, it will not be contacted.] This will mean that only the initial INVITE from the MSC will have an additional "hop" before finding the correct ATCF. If the UE has de-registered at the "primary" ATCF, the SCC AS will need to update the STN-SR to the "next" ATCF being registered. It may also need to update the new primary ATCF with any additional ATCF that exists.

Variant 5

The procedure of variant 5 is similar to that of variant 4 with the exception that in bullet 1)c) the ATCF X subscribes to the SCC AS (instead of to ATCF Y) for changes of active/held sessions in order to learn which sessions exist, and the SCC AS (instead of ATCF Y) updates ATCF X regarding ongoing sessions.

Figure 16:
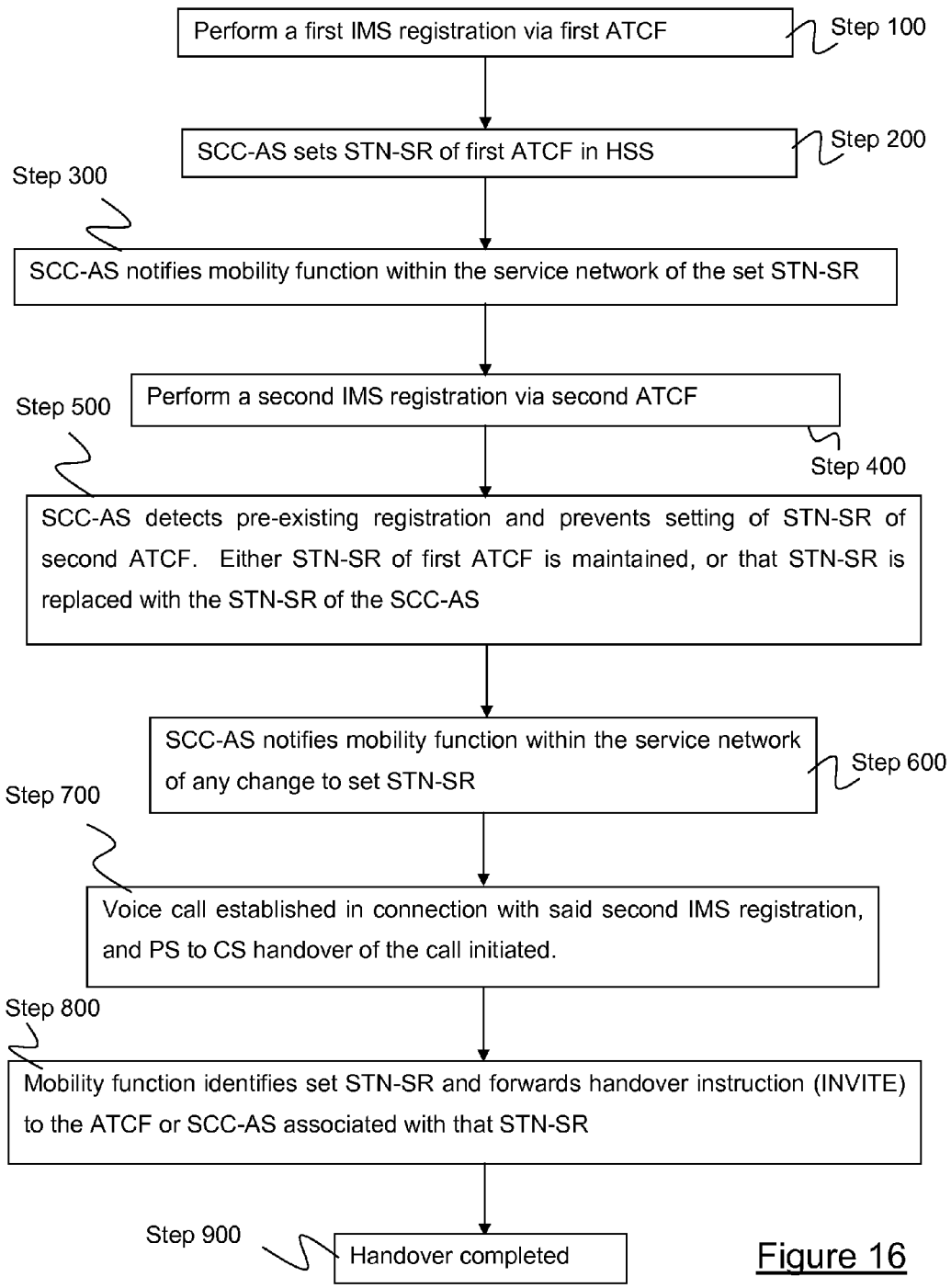
FIG. 16 is a flow diagram illustrating in general terms an improved procedure for controlling PS to CS handover of voice calls.

To further illustrate the approaches presented above, FIG. 16 is a flow diagram showing the main steps for facilitating control of the PS to CS access handover. At step 100, a user performs a first IMS registration via a first ATCF residing in the serving network. This results, at step 200, in the SCC-AS setting the STN-SR of that ACTF in the HSS. At step 300, the SCC-AS notifies the mobility function (that is the MME or SGSN) in the serving network of the set STN-SR.

At step 400, the UE performs a second (or further) IMS registration, this time via a different ATCF. At step 500, the SCC-AS receives the registration attempt and determines that the user is already registered. As a result, the SCC-AS prevents any setting of the STN-SR (in the HSS) to that of the second ATCF, and rather either maintains the set STN-SR of the first ATCF or replaces that with the STN-SR of the SCC-AS (i.e. fallback to Rel-9). At step 600, at least in the case that the set STN-SR has changed, the SCC-AS notifies the mobility entity of the changed set STN-SR.

At step 700, a voice call is established by the user in connection with the second registration. A handover from the PS access to the CS access is then initiated. As a result, at step 800, the mobility function identifies the set STN-SR (of which it has been notified by the SCC-AS), and sends the handover instruction to the ATCF associated with that set STN-SR. The handover process is completed at step 900 with procedures not illustrated in the figure.

Figure 17:
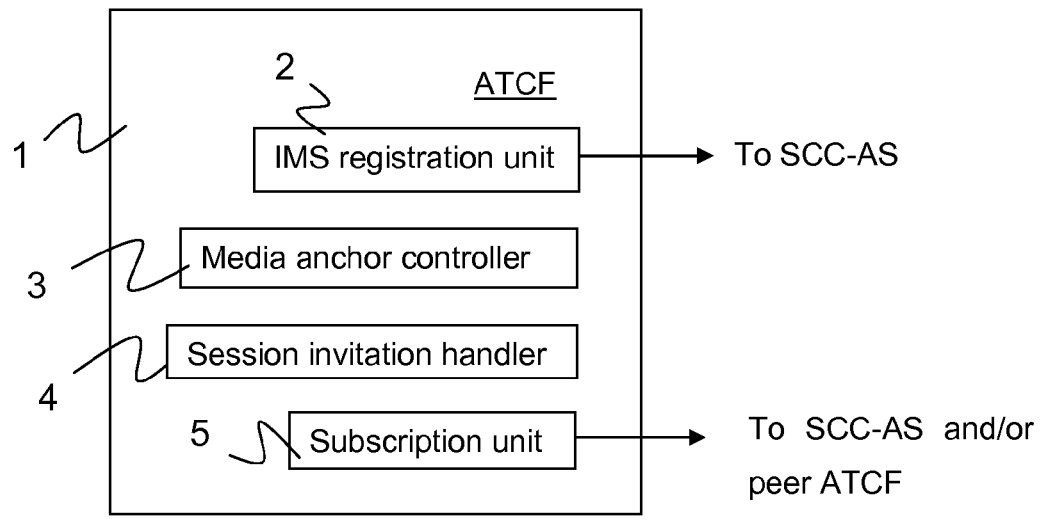
FIG. 17 illustrates schematically apparatus configured to operate as an ATCF.

FIG. 17 illustrates schematically an ATCF 1 configured to implement the handover control approach described above. The ATCF is implemented using appropriate hardware and software components. It includes a number of functional components including:

An IMS registration unit 2. This component is responsible for forwarding IMS registration requests (Register) to the SCC-AS in a user's home network. This unit includes within the requests its own STN-SR if appropriate.

A media anchor controller 3. This controller is responsible for making decisions as to whether or not the ACTF should anchor media sessions. In particular, the controller receives, and implements, anchor control instructions received from the SCC-AS, e.g. when the ACTF makes a second or further IMS registration for a user and the SCC-AS instructs the ATCF not to anchor sessions associated with the second or further registration.

A session invitation handler 4. This component acts on instructions received from the media anchor controller, e.g. when the ATCF is associated with a second or further IMS registration such that the ACTF does not anchor media sessions, to forward session requests (from the user) to either a peer ATCF responsible for a primary IMS registration or the SCC-AS in the case of a fallback to Rel-9 handover procedures. A subscription unit 5. This unit is operational when the ATCF is responsible for the primary IMS registration, that is when the ACTF is anchor for the media sessions. It is responsible for subscribing the ATCF to one of the SCC-AS and a peer ATCF such that it learns of media sessions handled by the peer ATCF and of the status of those sessions.

Figure 18:
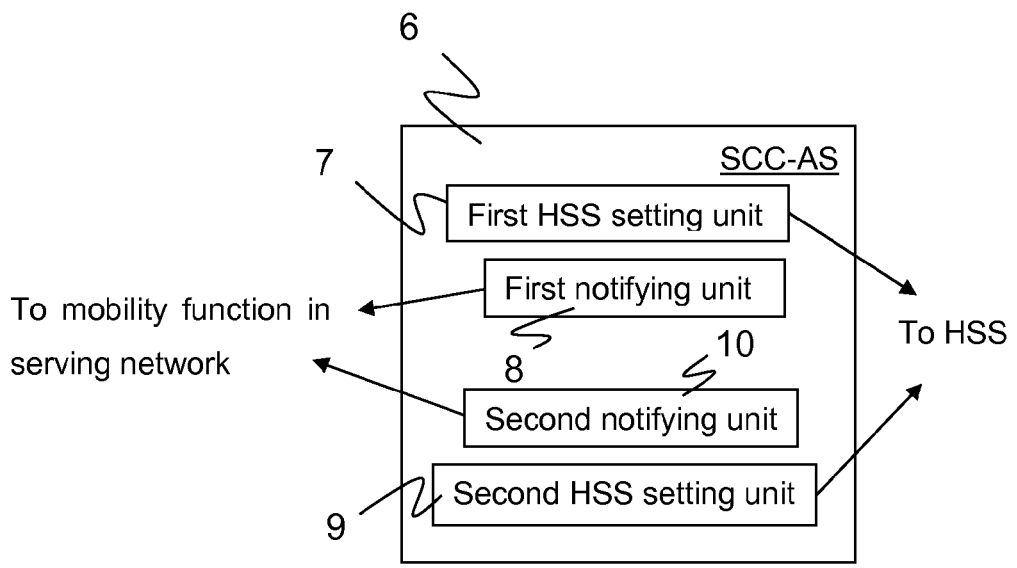

FIG. 18 illustrates schematically an SCC-AS 6 configured to implement the handover control approach described above. The SCC-AS is implemented using appropriate hardware and software components. It includes a number of functional components including:

A first HSS setting unit 7. This setting unit is responsive to a first IMS registration in respect of a user to set the STN-SR of the associated ATCF in the HSS in respect of the user.

A first notifying unit 8. This unit is responsible for notifying a mobility function in the serving network (e.g. MME/SGSN) of the STN-SR set in the HSS for the user.

A second HSS setting unit 9. This unit is responsive to a second or further IMS registration for the same user in order to either maintain the existing STN-SR set in the HSS or to overwrite that with the STN-SR of the SCC-AS.

A second notification unit 10. This unit notifies the mobility function in the serving network of any change to the set STN-SR for the user, e.g. a change to the STN-SR of the SCC-AS.

It will be appreciated by the person of skill in the art that various modifications may be made to the above described embodiments without departing from the scope of the present invention. In particular, it will be appreciated that the terminology used above should not be limited to the currently specified 3G standards and is intended to encompass future developments and enhancements. For example, the terms "access transfer control function", "access transfer gateway", and "service centralisation and continuity application server" as used above and in the appended claims are not to be restricted to the specific definitions given in the existing 3G standards. Rather, the terms should be considered to identify general functionality that will be maintained throughout the further developments and enhancements of those standards.

The invention claimed is:

1. A method of enabling the management of handovers of voice calls from a Packet Switched, PS, access to a Circuit Switched, CS, access where the voice calls are established using an IP Multimedia Subsystem, IMS, network, the method comprising:
   performing a first IMS registration of a user via said PS access including:
      setting for the user in a Home Subscriber Server, HSS, of the user's home network, an identifier of a first access transfer control function, which access transfer control function is responsible for anchoring user media sessions in an access transfer gateway of a serving network, and
      notifying a mobility function within said service network of the set identifier;
   performing a second or further IMS registration of the same user via said PS access, including:
      determining that said first IMS registration exists,
      in response to determining that said first IMS registration exists, preventing the setting of an identifier of a second or further access transfer control function in the HSS for the user, whilst either maintaining the setting of the identifier of the first access transfer control function or replacing that with an identifier of a service centralisation and continuity application server, and
      notifying said mobility function of any change to the set identifier; and
   in the event of a requirement to handover an ongoing voice call associated with said second or further IMS registration from said PS to said CS access, using the identifier currently set in the HSS and identified to the mobility function to manage the handover.

2. A method according to claim 1, wherein using the identifier currently set in the HSS and identified to the mobility function to manage the handover comprises:
   directing a session initiation from a Mobile Switching Centre, MSC, located within a CS core network, to either the first access transfer control function or the service centralisation and continuity application server using the identifier currently set in the HSS and known to the mobility function.

3. A method according to claim 1, wherein each said identifier is a Session Transfer Number Single Radio, STN-SR, identifier.

4. A method according to claim 1, wherein, at IMS registration, an access transfer control function may include its identifier in a registration message sent to the service centralisation and continuity application server.

5. A method according to claim 4, wherein a setting of an identifier in the HSS is performed by the service centralisation and continuity application server.

6. A method according to claim 1, wherein said mobility function is a Mobility Management Entity, MME, of an Evolved Packet Core, EPC, network or a Serving GPRS Support Node, SGSN, of a GPRS network.

7. A method according to claim 1, further comprising, when an IMS registration of a user does not result in the setting of an identifier for the ATCF associated with the registration, sending a notification to that ATCF to instruct the ATCF not to anchor any media sessions associated with the IMS registration.

8. A method according to claim 1, further comprising always replacing the identifier of the first access transfer control function with the identifier of a service centralisation and continuity application server upon performing said second or further IMS registration.

9. A method according to 1,
   wherein:
      a) when during said step of performing a second or further IMS registration it is determined that said first IMS registration exists, the method further comprises:
         sending, from said second or further access transfer control function to said service centralisation and continuity application server, said identifier for the second or further access transfer control function, and
         maintaining the setting of the identifier of the first access transfer control function in the HSS; and
      b) when during said step of performing a second or further registration it is determined that said first IMS registration does not exist, the method further comprises:
         not sending, from said second or further access transfer control function to said service centralisation and continuity application server, said identifier for the second or further access transfer control function, and
         maintaining the setting of an identifier of a service centralisation and continuity application server in the HSS.

10. A method according to claim 9, further comprising in case b), responding to de-registration of one of the existing registrations by setting in the HSS the identifier of the access transfer control function corresponding to a remaining registration.

11. A method according to claim 9; and comprising,
   wherein using the identifier currently set in the HSS and identified to the mobility function to manage the handover comprises directing a session initiation from a Mobile Switching Centre, MSC, located within a CS core network, to either the first access transfer control function or the service centralisation and continuity application server using the identifier currently set in the HSS and known to the mobility function; and wherein in case a), at said second or further IMS registration, sending from the service centralisation and continuity application server to said second or further access transfer control function, said identifier for the first access transfer control function, whereupon at handover said session invitation is forwarded from the second or further access transfer control function to the first access transfer control function.

12. A method according to claim 9:
wherein using the identifier currently set in the HSS and identified to the mobility function to manage the handover comprises directing a session initiation from a Mobile Switching Centre, MSC, located within a CS core network, to either the first access transfer control function or the service centralisation and continuity application server using the identifier currently set in the HSS and known to the mobility function; and
wherein in case a), at said second or further IMS registration, sending from the service centralisation and continuity application server to said first access transfer control function, said identifier for the second or further access transfer control function, whereupon at handover said session invitation is forwarded from the second or further access transfer control function to the first access transfer control function.

13. A method according to claim 1, further comprising subscribing said first access transfer control function to one of said second or further access transfer control function and said service centralisation and continuity application server such that said first access transfer control function is informed of changes to active/held sessions associated with said second or further IMS registration.

14. An IP Multimedia Subsystem application server configured to implement service centralisation and continuity functionality to enable the management of handovers of voice calls from a Packet Switched, PS, access to a Circuit Switched, CS, access where the voice calls are established using an IP Multimedia Subsystem, IMS, network within which the application server resides, the application server comprising:
a first Home Subscriber Server, HSS, setting unit configured, at a first IMS registration of a user via said PS access, to set for the user in a Home Subscriber Server, HSS, of the user's home network, an identifier of a first access transfer control function, which access transfer control function is responsible for anchoring user media sessions in an access transfer gateway of a serving network;
a first notifying unit for notifying a mobility function within said service network of the set identifier;
a second Home Subscriber Server, HSS, setting unit configured, at a second or further IMS registration of the same user via said PS access, to:
determine that said first IMS registration exists:
in response to determining that said first IMS registration exists, to prevent the setting of an identifier of a second or further access transfer control function in the HSS for the user, whilst either maintaining the setting of the identifier of the first access transfer control function or replacing that with an identifier of a service centralisation and continuity application server; and a second notifying unit for notifying said mobility function of any change to the set identifier.

15. An application server according to claim 14, wherein said second HSS setting unit is configured to always replace the identifier of the first access transfer control function with the identifier of a service centralisation and continuity application server upon performing said second or further IMS registration.

16. An application server according to claim 14, wherein said second HSS setting unit is configured to:
a) when during said second or further IMS registration it is determined that the first IMS registration exists, respond by:
sending, from said second or further access transfer control function to said application server, said identifier for the second or further access transfer control function, and
maintaining the setting of the identifier of the first access transfer control function in the HSS, and
b) when during said second or further registration it is determined that the first IMS registration does not exist, respond by:
not sending, from said second or further access transfer control function to said application server, said identifier for the second or further access transfer control function, and
maintaining maintain the setting of an identifier of a service centralisation and continuity application server in the HSS.

17. An application server according to claim 16, wherein said second HSS setting unit is configured, in case b), upon de-registration of one of the existing registrations, to set in the HSS the identifier of the access transfer control function corresponding to a remaining registration.

18. An application server according to claim 16, further comprising a third notifying unit configured, in case a), to send to said second or further access transfer control function, said identifier for the first access transfer control function.

19. An application server according to claim 16, further comprising a third notifying unit configured, in case a), to send to said first access transfer control function, said identifier for the second or further access transfer control function.

20. Apparatus that implements an access transfer control function to control an access transfer gateway, and manages handovers of voice calls from a Packet Switched, PS, access to a Circuit Switched, CS, access where the voice calls are established using an IP Multimedia Subsystem, IMS, network, the apparatus comprising:
an IMS registration unit configured to forward an IMS registration request for a user to a service centralisation and continuity application server and to include in the registration request an identifier of the apparatus when the apparatus will anchor subsequent media sessions on behalf of the user;
a media anchor controller configured to subsequently receive from said service centralisation and continuity application server, an instruction not to anchor said media sessions and to respond to the instruction by not anchoring said media sessions; and
a session invitation handler configured to forward session invitations relating to said user, to a peer access transfer control function identified in said instruction or to said service centralisation and continuity application server.

21. Apparatus that implements an access transfer control function to control an access transfer gateway, and manages handovers of voice calls from a Packet Switched, PS, access to a Circuit Switched, CS, access where the voice calls are established using an IP Multimedia Subsystem, IMS, network, the apparatus comprising:

an IMS registration unit configured to forward an IMS registration request for a user to a service centralisation and continuity application server and to include in the registration request an identifier of the apparatus;

a media anchor controller configured to subsequently receive from said service centralisation and continuity application server, an instruction to anchor media sessions handled by a peer access transfer control function; and a subscription unit that subscribes the apparatus to one of said service centralisation and continuity application server and said peer access transfer control function so as to receive notifications of changes of active/held sessions handled by said peer access transfer control function.

* * * * *

UNITED STATES PATENT AND TRADEMARK OFFICE
CERTIFICATE OF CORRECTION

PATENT NO. : 8,374,173 B2  
APPLICATION NO. : 12/996694  
DATED : February 12, 2013  
INVENTOR(S) : Sedlacek et al.

Page 1 of 1

It is certified that error appears in the above-identified patent and that said Letters Patent is hereby corrected as shown below:

In the Specification:

In Column 2, Line 36, delete "(MSS)" and insert -- (MSC) --, therefor.

In Column 7, Line 45, delete "ATFC" and insert -- ATCF --, therefor.

In Column 10, Line 17, delete "ACTF" and insert -- ATCF --, therefor.

In Column 10, Line 48, delete "ACTF" and insert -- ATCF --, therefor.

In Column 10, Line 51, delete "ACTF" and insert -- ATCF --, therefor.

In Column 10, Line 58, delete "ACTF" and insert -- ATCF --, therefor.

In Column 10, Line 64, delete "ACTF" and insert -- ATCF --, therefor.

In the Claims:

In Column 12, Line 64, in Claim 11, delete "9; and comprising," and insert -- 9: --, therefor.

In Column 13, Line 59, in Claim 14, delete "exists:" and insert -- exists; --, therefor.

In Column 14, Line 27, in Claim 16, delete "maintaining maintain" and insert -- maintaining --, therefor.

Signed and Sealed this  
Second Day of September, 2014

Michelle K. Lee  
*Deputy Director of the United States Patent and Trademark Office*